United States Patent [19]
Rose, Jr.

[11] Patent Number: 5,127,101
[45] Date of Patent: Jun. 30, 1992

[54] SIMULCAST AUTO ALIGNMENT SYSTEM

[75] Inventor: George D. Rose, Jr., Lynchburg, Va.

[73] Assignee: Ericsson GE Mobile Communications Inc., Lynchburg, Va.

[21] Appl. No.: 649,049

[22] Filed: Feb. 1, 1991

[51] Int. Cl.[5] .............................................. H04B 1/00
[52] U.S. Cl. .................................. 455/51.1; 455/67.1
[58] Field of Search ....................... 455/18, 33, 51, 53, 455/54, 56, 57, 67; 375/11, 12

[56] References Cited

U.S. PATENT DOCUMENTS

| | | | |
|---|---|---|---|
| 4,317,220 | 2/1982 | Martin | 455/58 |
| 4,475,246 | 10/1984 | Batlivala | 455/18 |
| 4,516,269 | 5/1985 | Krinock | 455/51 |
| 4,570,265 | 2/1986 | Thro | 455/52 |
| 4,696,052 | 9/1987 | Breedon | 455/51 |
| 4,718,109 | 1/1988 | Breeden et al. | 455/51 |
| 4,850,032 | 7/1989 | Freeburg | 455/56 |
| 5,014,344 | 5/1991 | Goldberg | 455/51 |
| 5,046,128 | 9/1991 | Bennett | 455/51 |

FOREIGN PATENT DOCUMENTS

61-107826  5/1986  Japan.

Primary Examiner—Curtis Kuntz
Attorney, Agent, or Firm—Nixon & Vanderhye

[57] ABSTRACT

In a multisite radio frequency simulcasting transmission system involving microwave-multiplex distribution paths to several transmitting sites, each path including manually settable amplitude and time delay devices for equalization of the modulation in signal overlap areas among the various transmitter sites, an automatic simulcast alignment device is included in each distribution path whereby transmissions between a control point and each site transmitter are periodically tested and each path is compensated for amplitude and time delay variations to thus maintain equalized amplitude and time of arrival of the modulation in the transmitter site overlap areas. Thus, the instantaneous distribution of the FM modulation sidebands is maintained to be ideally identical in the signal overlap areas.

26 Claims, 4 Drawing Sheets

SIMULCAST AUTO ALIGNMENT SYSTEM

RELATED APPLICATIONS

This application is related to the following commonly assigned U.S. applications:

Application Ser. No. 07/260,184 of Rose et al filed Oct. 20, 1988, entitled "Public Service Trunking Simulcast System";

Application Ser. No. 07/229,814 of Childress et al filed Aug. 8, 1988 entitled "Dynamic Regrouping in a Trunked Radio Communication System";

Application Ser. No. 056,922 of Childress et al filed Jun. 3, 1987 entitled "Trunked Radio Repeater System" now U.S. Pat. No. 4,905,302, issued Feb. 27, 1990.

Application Ser. No. 056,924 of Childress filed Jun. 3, 1987 entitled "Adaptive Limiter/Detector Which Changes Time Constant Upon Detection of Dotting Pattern" now U.S. Pat. No. 4821,292, Issued Apr. 11, 1980.

Application Ser. No. 056,923 of Childress et al filed Jun. 3, 1987 entitled "Apparatus and Method for Transmitting Digital Data Over a Radio Communication Channel" now U.S. Pat. No. 4,905,234, issued Feb. 27, 1990.

Application Ser. No. 085,572 of Nazarenko et al filed Aug. 14, 1987 entitled "Processor-to-Processor Communications Protocol for Public Service Trunking System" now U.S. Pat. No. 4,835,731, issued May 30, 1989.

Application Ser. No. 181,441 of Childress filed Apr. 14, 1988 entitled "Signalling Protocol for a Trunked Radio Repeater System" now U.S. Pat. No. 4,939,746, issued Jul. 3, 1990.

The disclosures of each of those related patent applications are incorporated by reference herein.

FIELD OF THE INVENTION

This invention relates to RF signal transmission systems and more particularly to a "simulcast" system for the simultaneous transmission of the same information by two or more RF transmitters that are used to extend the coverage area of a base station beyond that which can be obtained from a single site. Still more particularly, the invention relates to the automatic alignment of a simulcast system which will compensate for time and amplitude variations in the modulated RF as distributed to and broadcast by the various simulcast sites after the system has been installed and manually aligned.

BACKGROUND AND SUMMARY OF THE INVENTION

Simulcast RF transmission systems involving multiple sites transmitting the same information from each on the same carrier frequency at the same time are generally well known. Such systems are highly desirable since as is well known it is normally not possible for a single RF repeater transmitting site to serve an arbitrarily large geographic coverage area of 800 to 2000 square miles as might be found in a mountainous, rather large county in California, for example. Nevertheless, public service units in such counties require that a mobile unit anywhere in the system be able to call in and receive information from either a control site or another mobile unit in that system. Practical and legal limitations, such as tower height, maximum effective radiated power limitations, natural topographical features which would block the signal transmission to particular areas dictate away from the use of single transmission sites. Accordingly, simulcasting systems are used which involve the technique of transmitting the same information from more than one transmitting site on the same carrier frequency and at the same time so as to extend the coverage area of a base station beyond that which can be obtained by the above noted single site.

The following in an exemplary but not exhaustive listing of prior issued patents describing various aspects of simulcasting in this type of environment:

U.S. Pat. No. 4,696,052 to Breedon
U.S. Pat. No. 4,570,265 to Thro
U.S. Pat. No. 4,516,269 to Krinock
U.S. Pat. No. 4,475,246 to Batlivala et al
U.S. Pat. No. 4,317,220 to Martin
Japanese Patent Disclosure No. 61-107826

Figure 1:
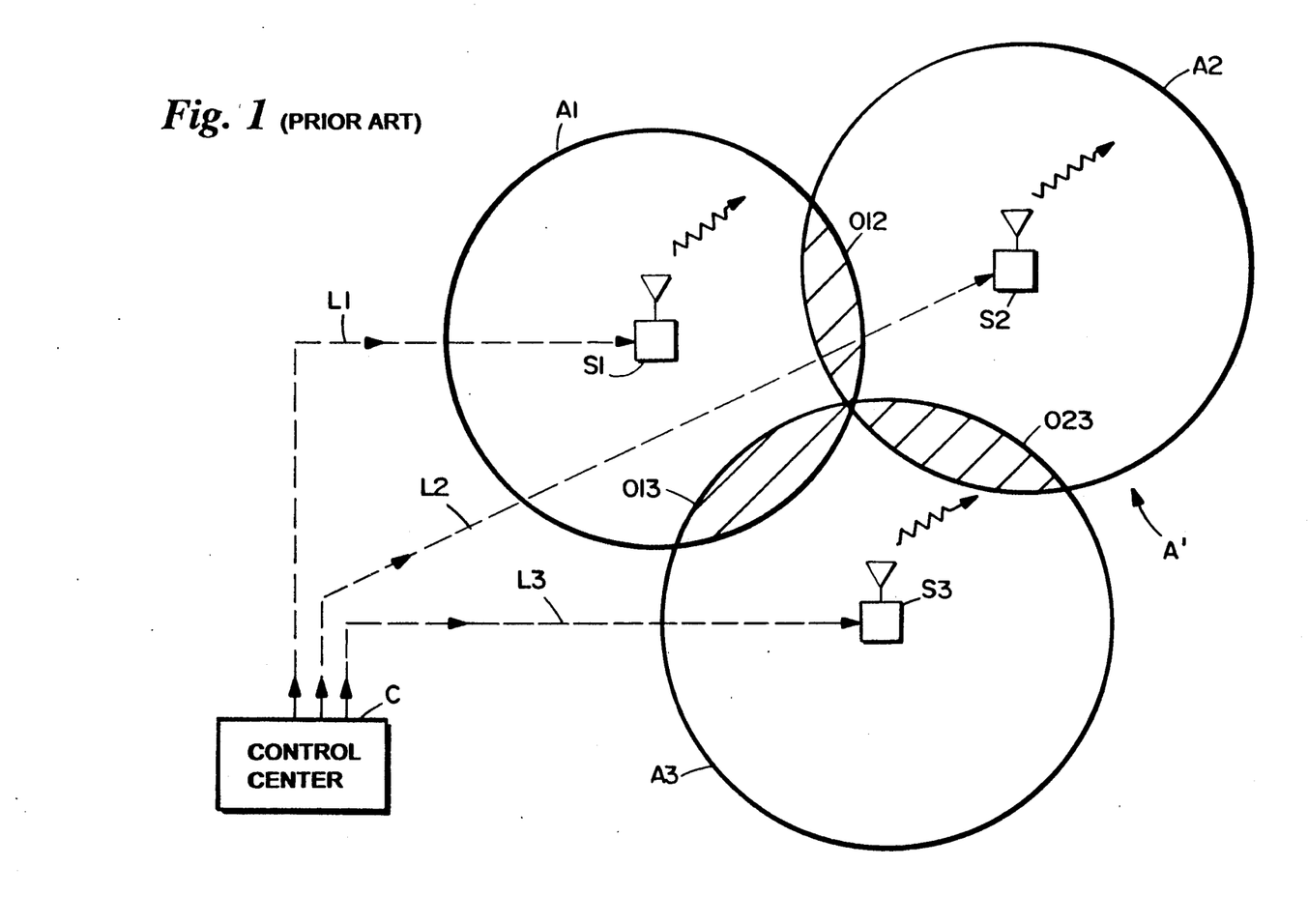
FIG. 1 is a schematic diagram of a prior art exemplary simplified multi-site RF communication simulcasting system

FIG. 1 is a schematic diagram of a simplified multiple-site system having three radio repeater (transmitting) sites S1, S2 and S3 providing communications to geographical coverage areas A1, A2 and A3, respectively. A control center or "hub" C (e.g., a dispatch center) provides identical signals to each of sites S1–S3 via links L1–L3, respectively (these links are typically microwave links but can be landline or other type links). Each site S1–S3 transmits the signals it receives from the control center C to its respective coverage area A, so that a mobile or portable transceiver receives the same signal no matter where it happens to be in the communications system overall coverage areas A' (which constitutes the "union", in an analogy to Venn diagrams, of the individual coverage areas A1, A2 and A3).

Mobile or portable transceivers within area A1 can receive the signals transmitted by site S1, transceivers within area S2 can receive the signals transmitted by site S2, and transceivers within area A3 can receive signals transmitted by site S3. Well-known mechanisms are provided in mobile and portable transceivers (and, in some cases, also at the sites) to ensure that transceivers moving out of a first site's coverage area and into a second site's area cease monitoring the signals transmitted by the first site and begin monitoring the signals transmitted by the second site—so that communication is continuously maintained without interruption so long as the transceiver stays within the overall combined system coverage area A'.

In order to prevent "dead zones" from existing at locations between the coverage areas A1–A3, it is desirable to set site transmit effective radiated output power levels (and to geographically locate the sites relative to one another) such that each coverage area slightly overlaps adjacent coverage areas. Overlap regions 012, 013 and 023 shown in the FIG. 1 are examples of such overlap areas. These overlap areas may extend for several miles. Hence, instead of a mobile or portable transceiver receiving no signal at a point effectively "equidistant" (taking effective radiated power into account) between two transmitting sites, the transceiver receives signals from two (or more) sites at the same time. System parameters can be selected so that the transceiver is guaranteed to receive at least one of the signals at a signal strength sufficiently great to overcome noise and Raleigh fading phenomenon and thus provide a useable received signal no matter where in the overlap region the transceiver is located.

While these overlap regions eliminate dead zones, they give rise to another problem: interference between the plural different signals a transceiver may simultaneously receive while it is within an overlap region. Two signals of slightly different RF frequencies produce heterodyning effects (i.e., generation of sum and difference frequencies) in the non-linear detector of a receiver receiving both signals, and may also produce transmit "nulls" (localized dead zones created by interference patterns). The beating and mixing of heterodyning generally must be avoided in a communications system of the type shown in FIG. 1, since it can cause a number of problems (e.g., annoying audible "beat notes" during voice communications), although the complete elimination of heterodyning may be less important in FM (frequency modulation) systems than in AM (amplitude modulation) systems due to the so-called "capture effect" (the FM limiter/detector of an FM receiver "captures" the strongest received signal and is less affected by weaker signals). Prior art solutions to the problems caused by unmatched transmit frequencies include the use of different, spaced-apart transmit frequencies at adjacent sites (undesirable because it requires receivers to alternately lock onto different, separated receive frequencies based on signal strength, a process which takes too much time), randomly varying the transmit frequencies relative to one another to continuously shift the position of interference pattern nulls (see U.S. Pat. No. 4,570,265 to Thro), and synchronizing the transmit frequencies of different sites via a pilot tone originated by a "master" site and transmitted over a voice channel to all of the remote sites (see U.S. Pat. No. 4,317,220 to Martin).

Another serious problem in modern digital FM-based RF communications systems is caused by unequal delay times existing within the system. Referring to FIG. 1, assume a mobile transceiver is located in overlap area 012 and is receiving modulated RF signals transmitted simultaneously by sites S1 and S2. The common signal used to modulate the RF signals transmitted by both site S1 and site S2 originates at control center C and must be transmitted over link L1 to site S1 and over link L2 to site S2. Unfortunately, the delays between the control point C and the inputs to the transmitter modulators of sites S1 and S2 are typically not equal to one another. Moreover, it is not practical to provide links L1-L3 with absolutely identical delay characteristics due to the difference in their physical lengths (the difference may be on the order of miles) and because even identically configured signal processing circuitry at the link ends may exhibit slightly different delay times. In addition, the site transmitter modulation circuits may introduce unequal delays, and further unequal delays exist because of the different RF signal path lengths between the transceiver sites S1 and S2.

Such time delay differences may typically be relatively short (on the order of milliseconds). However, a transceiver located in an overlap region typically alternately receives first one signal and then another signal as the signals fade or the transceiver moves in and out of "shadows" created by obstructions between the transceiver and the transmitting sites (this process of receiving first one signal, then another, and then the one signal again is caused in part by multipath fading effects). Even minor differences in delay times become extremely significant during transmission of digital data or other modulation.

By way of further simplified explanation, nearly everyone while watching television has occasionally come across the same program simulcasted over two different television channels with one version of the program being slightly delayed (e.g. up to several seconds) with respect to the other. It is possible to watch a few seconds of the program on one channel, and quickly change the channel selector to watch the same few seconds again on the other channel. Similarly, a few seconds of the program will actually be "missed" by the viewer if he watches the version of the program which "lags" behind the other version and then quickly switches the program selector to the other channel (which is several seconds "ahead" of the lagging channel).

Now suppose the television receiver regularly, rapidly alternated between the two channels at more or less random times and could not be prevented from doing so (as is the case with a radio transceiver located in an overlap region between two sites of a multisite RF communications system). Needless to say, even voice transmissions would become severely distorted if differential delays of a few milliseconds—let alone seconds—exist in the system. Additionally, high speed digital data becomes severely garbled if it is simulcasted in a system exhibiting more than a few microseconds (millionths of a second) of delay between the time one site transmits a data bit and the time an adjacent site transmits the same data bit.

Fortunately, it is typically possible to minimize time delay differences to on the order of less than a microsecond through various known techniques. For example, it is well known in the art to introduce adjustable delay networks (and phase equalization networks) in line with some or all of links L1-L3 to compensate for inherent different link delay times (see U.S. Pat. No. 4,516,269 to Krinock and U.S. Pat. Nos. 4,696,051 and 4,696,052 to Breeden). Typical conventional digital microwave-multiplex (time domain multiplex) systems exhibit amplitude, phase and delay characteristics that are extremely stable over long periods of time (e.g., many months), so that such additional delays, once adjusted, guarantee that a common signal inputted to all of links L1-L3 at the same time will arrive at the other ends of the links at almost exactly the same time. The same or additional delays can be used to compensate for different, constant delay times introduced by signal processing equipment at the sites S1 and S3 to provide simultaneous coherent transmission of the signals by the different sites.

Analog microwave-multiplex systems (frequency domain multiplex), on the other hand, are effected much more by daily and seasonal propagation variations. Accordingly, if analog microwave systems are employed, frequency simulcast system timing realignment is required, in some cases as often as daily. Attempts to install a simulcast system where analog microwave links exist and replacement costs are prohibitive would for the aforementioned reasons be less than an ideal system. That is to say, after installation of the simulcast system including conventional amplitude and time delay alignment of the system would require frequent realignment. Similar observations may be made with regard to attempts to install a simulcast system where some of the existing sites involve digital microwave links and others involve analog microwave-multiplex systems.

I have discovered that so long as the microwave radio or optical distribution system from the control center to the various sites is phase stable so that the time of arrival of the modulation at one transmit site remains stable relative to the time of arrival of the modulation at any other transmit site, an automatic simulcast system alignment feature may be added whereby automatic periodic alignment is performed. Such alignment will maintain the amplitude and time delay alignment or equalization obtained in the initial manual alignment. This feature is implemented using a single tone on a periodic basis to select and key on each site in a sequential fashion so that the tone is transmitted, received at the control site and processed by computer for comparing it with a reference value and thereafter producing appropriate amplitude and time correction which will compensate for time and amplitude variations in the modulation as distributed to the various simulcast sites. Although auto alignment sequence for each site is implemented on a periodic basis, the alignment mode is activated only where no system activity is sensed. Moreover, during the alignment procedure, if channel activity is sensed, the system switches from alignment mode to normal transmission mode until the system channels are again traffic free. It is, therefore, a primary object of my invention to use a manual alignment procedure to obtain appropriate frequency response and time delay alignment and then implement a periodic auto alignment sequence to maintain the proper alignment.

BRIEF DESCRIPTION OF THE DRAWINGS

These and other features and advantages of the present invention will be better and more completely understood by referring to the following detailed description of the presently preferred exemplary embodiments in conjunction with the accompanying drawings of which.

DETAILED DESCRIPTION OF THE PRESENTLY PREFERRED EXEMPLARY EMBODIMENTS

As aforementioned, the simulcasting technique involves the transmission of the same data or modulation from more than one transmitting site on the same carrier at the same time with ideally no interference occurring in the areas of signal overlap from the various sites. Such overlap areas may extend for about ten miles and the number of such overlap areas may be large since the simulcast system may be designed to cover an area of 800 to 2000 square miles. Although such areas may be quite large, they are substantially smaller than the area covered by conventional satellite systems which, as a practical matter, are not feasible for serving these limited geographical areas.

In simulcasting, the elimination of interference in the areas of signal overlap from the various transmission sites is usually accomplished by maintaining the RF carrier frequencies very stable, as well as controlling and maintaining the amplitude and time of arrival of the modulation in the overlap areas. Without such control, simultaneously transmitting on eight or ten transmitters all on the same frequency would clearly result in interference at any receiver in the overlap areas due to heterodyning and the like. Elimination of such interference by properly setting and maintaining the amplitude and time of arrival of the signal modulation in the overlap areas requires a microwave, radio or optical distribution system from a control point or site to the various outlying simulcast transmitter sites that is phase stable. That is to say, the time of arrival of the modulation at one transmit site must remain stable relative to the time of arrival of the modulation at any other transmit site. Typically, audio phase time delay and frequency response equalization equipment is incorporated in each stable path of the distribution system so as to provide a means for making the FM modulation side bands identical at the desired location in a signal overlap area.

Preferably, digital microwave-multiplex systems, otherwise known as time domain multiplex systems, are conventionally employed in the signal distribution paths or links, since experience has indicated that manual realignment of such links may not be required for many months. However, analog microwave-multiplex systems, otherwise known as frequency domain multiplex, are also conventionally used and have been installed in many existing systems. Such microwave links are effected much more than digital systems by daily and seasonal propagation variations and require frequent timing alignment (sometimes daily) when they are employed in simulcast transmission systems. Replacement of such links with digital microwave-multiplex system links, albeit desirable from an alignment maintenance viewpoint, is not often feasible due to the high costs involved in such substitutions.

My presently preferred embodiment incorporates an automatic simulcast system alignment feature which is computer controlled and which will periodically compensate for time and amplitude variations in the modulation as distributed to the various outlying simulcast sites. Once the frequency and phase response of each voice channel is manually equalized, the control site computer on a predetermined time basis will switch from a normal transmission mode to an alignment mode wherein sequential time delay and amplitude adjustment steps are implemented. It is to be noted, however, that the auto alignment sequence for a site will not be initiated without first confirming that no system activity is present. Moreover, if the auto alignment sequence is initiated and it is determined that the channel being tested is needed for traffic, the alignment sequence will be terminated and reinstituted at a later time.

Figure 2A:
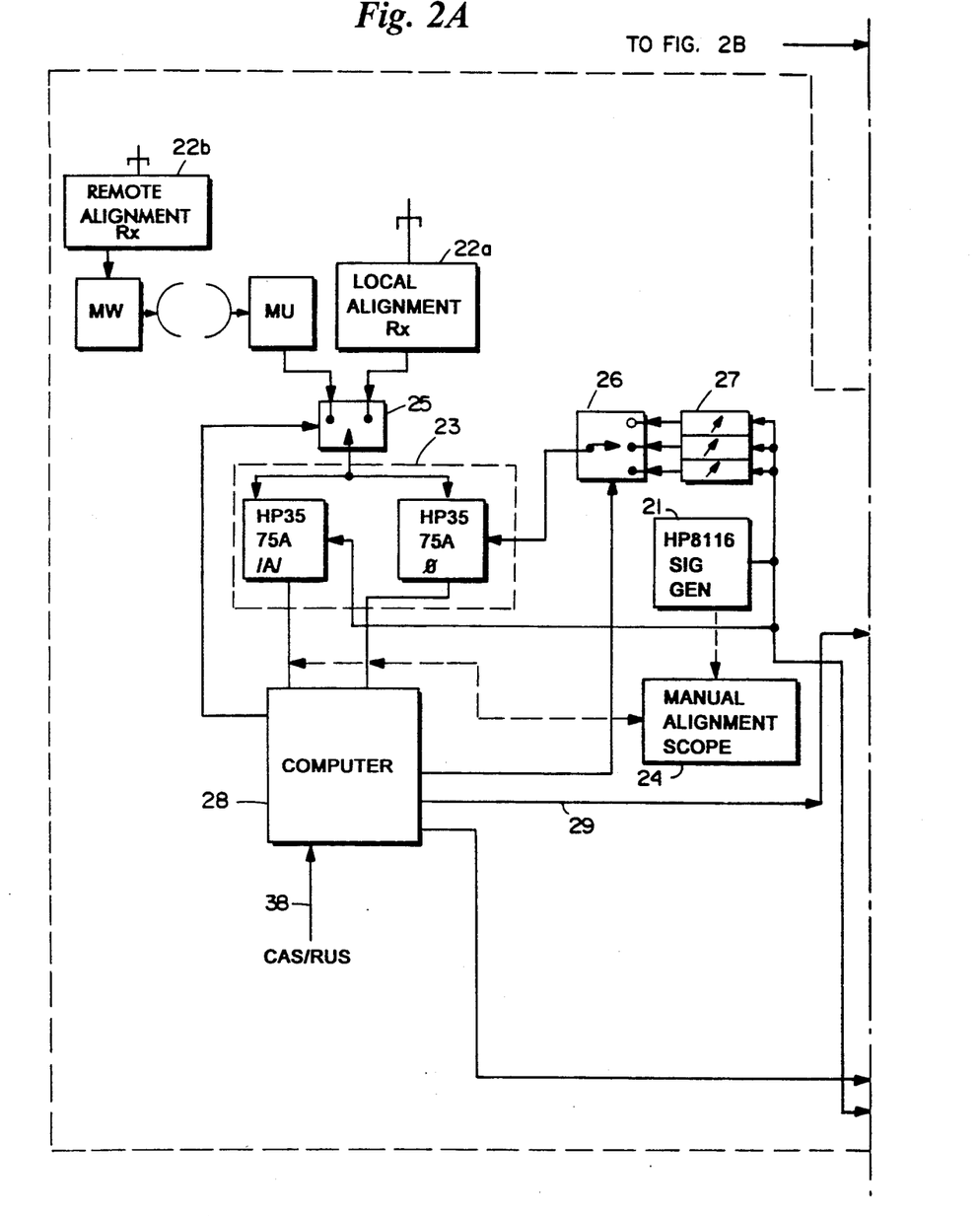
FIGS. 2A and 2B are schematic block diagrams illustrating in a more detailed manner the presently preferred embodiment of a multi-site RF simulcasting communication system incorporating the auto alignment approach detailed below.
Figure 2B:
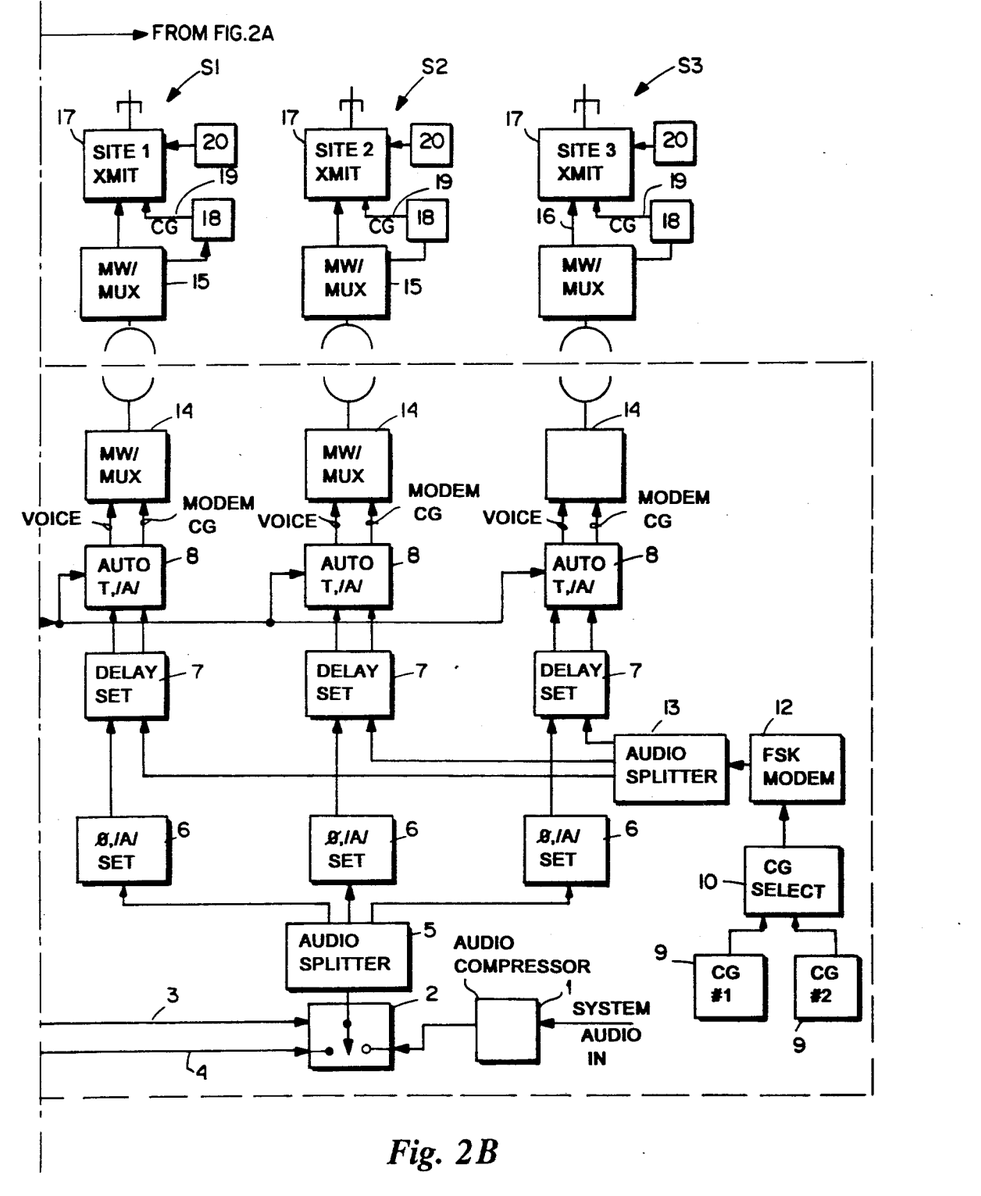

Referring to FIGS. 2A and 2B, audio from a receiver selector (not shown) is fed to the input of an audio compressor 1 at the control site C. The audio compressor may be a type 4006 Tellabs compressor which passes its output through a computer controlled audio switch 2 which selects either a normal transmission mode by way of input 3 of an alignment mode of operation on input 4. The audio is then fed to the input of an audio bridge or splitter which may have as many as ten outputs that are delivered to the individual equalizers included in each audio path.

Each of the audio paths assigned to a particular site transceiver includes a manually settable amplitude/delay equalizer 6 which may be similar to a Tellabs type 4041 equalizer, as well as a manually settable simulcast time delay equalizer 7, such as an Ericsson-General Electric equalizer of the nature shown in publication No. LBI-38477 entitled "Delay Unit Shelf Assembly".

Each site audio path of the presently preferred embodiment additionally includes a simulcast automatic delay and amplitude equalizer 8 for periodically producing correction signals for maintaining proper amplitude and time of arrival of the modulation in the simulcast system overlap areas. That is to say, the purpose of the auto alignment element is to maintain the instantaneous distribution of the FM modulation side bands so as to be ideally identical in the signal overlap areas. In this regard, to be ideally identical the data or modulation must arrive from the two or more involved sites at the middle of the overlap area within 5 microseconds of the same time. Additionally, ideally the amplitudes of the modulations will vary no more than a tenth of a db.

Under such circumstances, a mobile at the center of such an overlap area but moving closer to one transmitter and further from another transmitter will receive data or other modulation at a time which skews away from that at the middle of the overlap area at the rate of about 10 microseconds per mile. However, such a mobile moving toward one transmitter site will receive a steadily stronger signal, while the signal from the now more remote site grows weaker. Additionally, as previously noted, FM receivers as used in conventional simulcast systems normally include FM limiter/detector arrangements in the mobile receiver for capturing the strongest received signal. Accordingly, as the mobile moves away from one transmitter and toward another in the overlap area, the mobile receiver captures the stronger of the two signals shortly after moving from the middle of the overlap areas. Additionally, since the transmitters in such simulcast systems typically require a stable carrier frequency normally to within one part in $10^9$, hetrodyning or the like between the two transmitters in such circumstances is normally eliminated.

In trunked radio systems, mobile units have heretofore been grouped into formalized related fleets. Each of the units of a fleet may, for example, have associated coding schemes such as continuous subaudible signals or digital signals that are transmitted to activate otherwise muted receivers. In this manner mobile users may be selected for particular messages as opposed to requiring a mobile user to monitor every message on the channel. Accordingly, "Channel Guard," a GE have name generally referred to as CTCSS, tones will be generated from signal sources 9 and a single such tone selected by switch element 10 at the control site. The tone will be used to modulate a frequency shift keyed (FSK) modem 12, the output of which will be fed through another audio splitter 13. Such modem signals will be passed through another channel of the amplitude, time and automatic equalizers for transmission over a second multiplex channel to each simulcast transmit site S1, S2 and S3.

At each of the transmit sites the equalized audio will be recovered from the microwave-multiplex transceiver channel elements 14 and 15 and used to directly modulate the voice input port 16 of the site transmitter 17. Additionally, the Channel Guard modem signal from the second multiplex channel will be connected to a corresponding FSK receive modem 18. Thereafter, the recovered Channel Guard tone is applied to the input port 19 of the transmitter 17. A high stability oscillator 20 is also associated with the site transmitters to provide carrier frequency stability to within one part in $10^9$.

Initially, the system is manually aligned by way of elements 6 and 7 through the use of an audio sweep generator 21 which may be, for example, a Hewlett-Packard type 8116 for sweeping an audio signal through the passband of each audio channel with the automatic time and amplitude equalizer adjustments set to midrange. The site being aligned will be keyed on the air and all the other sites will be off. The transmitted signal produced by the selected site will be received at an alignment receiver 22a, which ideally is located at the control center C. The output of the alignment receiver is connected to a Hewlett-Packard type 3575 phase/gain meter 23. The output of the phase/gain meter is also displayed on a storage oscilloscope 24 which may be a Tektronix type 2432.

Where it is not possible to receive all of the site transmissions at the control point alignment receiver, one or more remotely located additional alignment receivers, such as 22b, may be used so long as their outputs are delivered back to the control point C over phase stable transmission paths. Additionally, if two or more alignment receivers are employed, proper alignment will require that each of these receivers share at least one simulcast transmit site in common with another alignment receiver such as 22a, so that common references may be established for the entire simulcast system.

The outputs from these alignment receivers are fed to the phase/gain meter 23 by way of computer controlled switch 25. An additional computer controlled switch 26 is used to select one of a bank of delay equalizers, one for each site which may comprise adjustable filters with switches that allow the insertion of increments of milliseconds or microseconds of delay into the reference path or test equipment path. Such reference equalizers are associated with the alignment equipment so as to normalize out the absolute time delay between the control site and each of the simulcast transmission sites. These delays are set during the manual alignment and will be the absolute time delay reference for automatic alignment as well. That is to say, since the alignment system will key on one site at a time rather than looking at one site relative to another, an absolute value of time delay is obtained one site at a time, wherein the absolute value includes the time of delay getting through the control center microwave equipment, propagation time to the site as well as propagation time through site equipment and the time for re-radiating the test tone and coming back to the monitor site. Measuring such absolute delay with subsequent difference determinations site to site may be compensated by way of settings of the reference delays 27. Control of the several switches for mode and site selection, as well as the storage of reference values and the like, is performed by an appropriately programmed PC type of computer 28.

Once the reference delays are set elements 6 and 7 are manually adjusted so as to set and maintain the amplitude and time of arrival of the modulation in the signal overlap areas.

Element 6 is a Tellabs type 4041 plug-in card equalizer for allowing differential phase delay adjustments by setting the initial audio frequency response and differential phase response at each of approximately 200 Hz steps up to approximately 3000 Hz. Element 7 is also adjusted so as to obtain the ideal time of arrival of the modulation in the signal overlap areas. The device is a time delay equalizer of the nature found in the aforementioned Ericsson-General Electric publication No. LBI-38477. Basically, the device is merely a tapped delay line in the form of a programmable shift register wherein the length of the shift register and, hence the delay, is selectable.

Both elements 6 and 7 are manually adjusted during the initial installation so as to obtain amplitude and time delay alignment whereby the modulation in the middle of the signal overlap areas will vary not more than a tenth of a db in amplitude and arrive within about 5 microseconds of the same time. Although such criteria are typically obtainable by way of manual adjustment, as aforementioned, some microwave systems, such as frequency division multiplex-microwave systems (analog) are not phase stable for long periods of time due to seasonal and, in the worst case, daily propagation variations. Accordingly, there is a need not only for manual alignment systems for initially obtaining phase and amplitude alignment, there is an additional need for an automated system for maintaining such alignment. As may be seen in FIGS. 2A and 2B, the automatic time and amplitude adjustment structure 8 is connected in each of the audio paths distributed to the sites and are controlled by the computer 28 by way of auto alignment bus 29. This auto alignment structure in the presently preferred embodiment is designed to provide a computer controlled adjustment of amplitude over a range of plus or minus 2 db, as well as a time delay adjustment over a range of plus or minus 500 microseconds.

Figure 3:
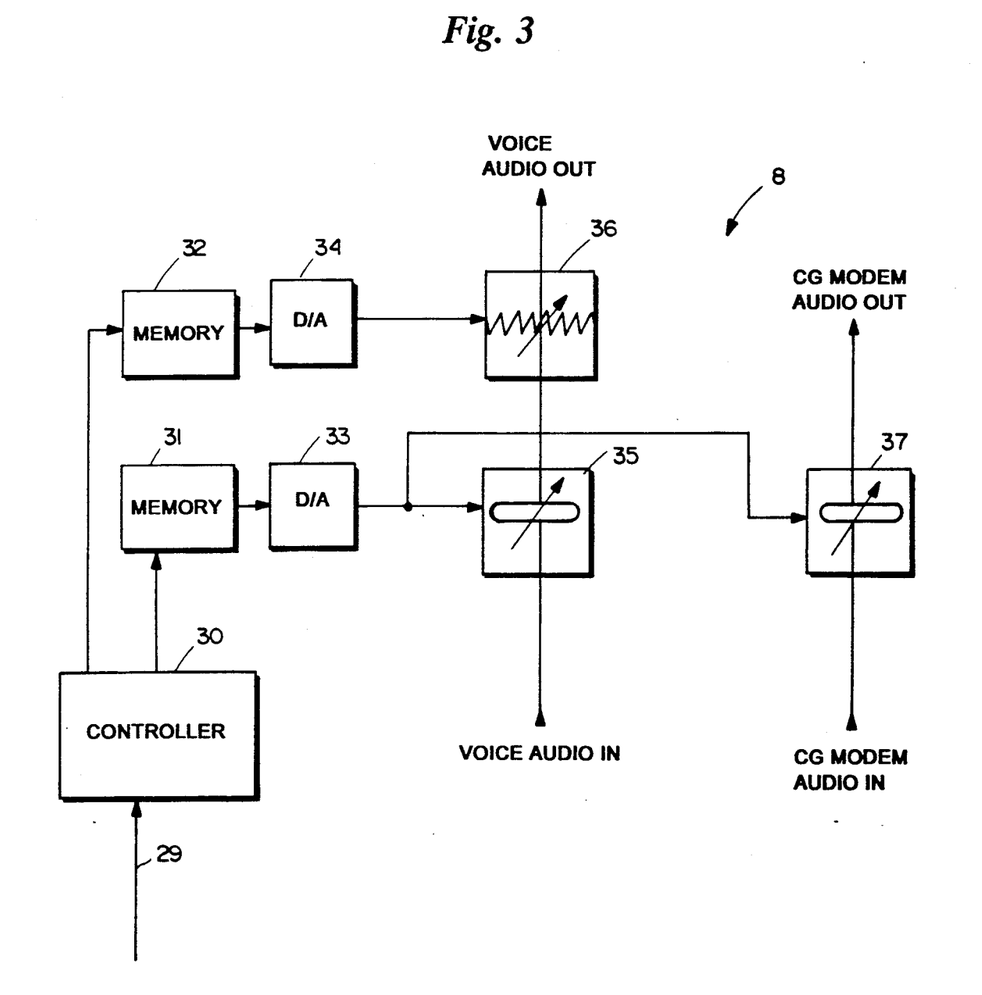
FIG. 3 is a more detailed schematic block diagram of the presently preferred embodiment for implementing the auto alignment feature of the simulcasting communication system of FIGS. 2A and 2B.

Referring to FIG. 3, it may be seen that the auto alignment structure 8 includes a type 8031 microprocessor controller 30 as an interface between computer 28 and nonvolatile RAM storage elements 31 and 32. Computer 28, upon periodically producing adjustment information, will transmit corrected set point data by way of auto alignment bus 29 and controller 30 such that the desired amplitude data for a particular simulcast site is stored in a nonvolatile storage device 32; whereas, time delay data is stored in nonvolatile memory 31. Digital data produced at the output of storage elements 31 and 32 are respectively converted to analog voltages by dedicated digital-to-analog converters 33 and 34. The automatic time delay adjustment voltage signal produced by converter 33 is used for controlling time delay means 35 which may be an adjustable bucket-brigade type of delay line for inserting the appropriate amount of delay in the voice channel of an audio path for a particular site. The same time delay voltage is used for adjustment of the Channel Guard channel by way of element 37 for each of the site audio paths. As will be noted, only automatic time delay correction is employed in the Channel Guard path since the Channel Guard tone is being transmitted by way of an FSK modem and the tone requires no amplitude adjustment.

In a similar fashion, computer generated amplitude adjustment data stored in nonvolatile device 32 and converted to an analog voltage will in turn be supplied to the amplitude adjustment element 36 which may be a programmable FET type of voltage variable attenuator.

As previously indicated during the manual simulcast system alignment, the automatic time and amplitude equalizer 8 will be switched into a midrange mode and left alone. However, once the manual alignment is completed, automatic equalization is made operational in order to maintain the system in proper alignment. Initiation of an auto alignment sequence is controlled by computer 28 wherein each site audio path is aligned on some predetermined timed basis. In this regard, however, the computer will first test for a system transmission activity by detecting inputs on line 38 which may include a Receiver Unsquelched Signal (RUS) or may be connected to a Carrier Activity Sensor (CAS). Upon sensing no activity, computer 28 will proceed to turn on the audio signal generator 21 to produce a 1 KHz tone, as well as selecting and keying on one of the sites. The 1 KHz tone in addition to being transmitted by the selected site is input to the phase/gain meter, as well as the computer. Thereafter, the value stored in the computer is compared with that which is received from the selected site by way of alignment receiver 22a, for example. Thereafter, the computer produces the appropriate amplitude and time delay data on the auto alignment bus 29 for storage in memory elements 32 and 31, respectively. As aforementioned, nonvolatile memory devices 31 and 32 will in turn furnish the stored data to the adjustment elements 36 and 37 by way of converter elements 33 and 34.

Upon completion of the adjustment procedure for the selected site the computer will continue on to the next site until all sites have been auto aligned or until the alignment procedure has been interrupted, which occurs whenever the system is required to service traffic in the normal mode. In the latter regard if during an auto alignment sequence a channel is needed for traffic thereon the computer will immediately terminate the alignment sequence and repeat it at some later time when no system activity is present. Accordingly, the presently preferred embodiment of the invention permits manual alignment in a simulcast system whereby amplitude and time of arrival of the modulation in the signal overlap areas as received from the separate transmission sites is equalized. Thereafter, a simulcast auto alignment sequence is initiated whereby such equalization is maintained.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a radio frequency simulcasting system including a control center connected to plural radio frequency transmitter sites by plural substantially phase stable distribution links for providing information for simultaneous transmission by each of the transmitters, a method of aligning said system for obtaining and maintaining substantially identical amplitude and time of arrival of the transmitted information in signal overlap areas between two or more of said transmitters, said method comprising the steps of:

(a) initially adjusting modulation signal amplitude equalization means incorporated in each said distribution link to obtain substantially identical amplitudes of transmitted information in said signal overlap areas;

(b) initially adjusting modulation signal time delay means incorporated in each said distribution link to obtain substantially identical times of arrival of the transmitted information in said signal overlap areas;

(c) periodically transmitting a test signal from said control center to a selected site transmitter for retransmission by said selected transmitter back to said control center;

(d) comparing said retransmitted signal received by said control center with reference data to produce correction information;

(e) adjusting additional amplitude equalization and time delay means incorporated in the distribution link of said selected site so as to compensate for said correction information; and (f) repeating steps (c) through (e) for each of said transmitter sites until all sites have been tested and adjusted, whereby substantially identical amplitude and time of arrival of transmitted modulation in signal overlap areas are maintained.

2. The method of claim 1 further including the step of:
sensing the presence of system communication activity; and
preventing the initiation of steps (c) through (f) if system communication activity is sensed.

3. The method of claim 1 further including the steps of:
sensing the presence of system communication activity; and
interrupting the execution of steps (c) through (f) if system communication activity is sensed.

4. The method of claim 1 further comprising the step of:
normalizing an absolute delay of transmissions between said control center and each said transmitter site before said initial adjusting of said amplitude equalization means and said time delay means.

5. The method of claim 1 further including the step of:
providing said distribution links with-microwave-multiplex audio paths.

6. The method of claim 1 wherein said initial adjusting steps are performed by manually adjusting said amplitude equalization means and said time delay means; and
steps (c) through (f) are performed automatically by computer control.

7. The method as in claim 1 further including the step of:
controlling the carrier frequency of each said radio frequency transmitter to be substantially identical at each simulcast transmitter site through the use of high stability oscillators at each site.

8. The method of claim 5 wherein said microwave-multiplex audio paths are each provided with at least two channels, said method including the further step of:
generating subaudible tones on one of said channels for providing control signals for transmission at said transmitter sites.

9. The method as in claim 8 wherein said control signals are frequency shift key modulated.

10. A radio frequency simulcasting system including a control center connected to plural radio frequency transmitter sites by plural substantially phase stable distribution links for providing information for simultaneous transmission by each of the transmitters, said system further including a apparatus for obtaining and maintaining substantially identical amplitude and time of arrival of the transmitted information in signal overlap areas between two or more of said transmitters, said apparatus comprising:
adjustable modulation signal amplitude equalization means in each of said distribution links for initially obtaining substantially identical amplitudes of transmitted information in said signal overlap areas;
adjustable modulation signal time delay means in each of said distribution links for initially obtaining substantially identical times of arrival of the transmitted information in said signal overlap areas;
means for periodically transmitting a test signal from said control center to a selected site transmitter for retransmission by said selected transmitter back to said control center;
means for comparing said retransmitted signal received by said control center with reference data to produce correction information;
additional amplitude equalization and time delay means responsive to said means for comparing for readjusting the modulation signal amplitude and time delay of said selected site in accordance with said correction information; and
control means for causing the functions of said means for periodically transmitting, said means for comparing and said additional amplitude equalization and time delay means to be sequentially performed for each said transmitter site until all sites have been tested and readjusted, whereby substantially identical amplitude and time of arrival of transmitted modulation in signal overlap areas are maintained.

11. The system of claim 10 wherein said apparatus further includes:
means for sensing the presence of system communication activity; and
means for preventing the initiation of the functions of said control means if system communication activity is sensed.

12. The system of claim 10 wherein said apparatus further includes:
means for sensing the presence of system communication activity; and
means for interrupting the execution of the functions of said control means if system communication activity is sensed.

13. The system of claim 10 wherein said apparatus further includes:
means for determining the absolute delay of transmissions between said control center and each said transmitter site and means for normalizing said absolute delays before said initial adjusting of said amplitude equalization means of said time delay means.

14. The system of claim 10 wherein said distribution links include microwave-multiplex audio paths.

15. The system of claim 10 wherein said adjustable amplitude equalization means and said adjustable time delay means are manually adjusted; and
said control means includes a digital computer.

16. The system as in claim 10 further including:
means for controlling the carrier frequency of each said radio frequency transmitter to be substantially identical at each simulcast transmitter site, said means including a high stability oscillator at each site.

17. The system of claim 14 wherein said microwave-multiplex audio paths are each provided with at least two channels; and
means for generating subaudible tones on one of said channels for providing control signals for transmission at said transmitter sites.

18. The system as in claim 17 wherein said control signals are frequency shift keyed modulated.

19. An automatic alignment circuit for use in each of a plurality of distribution paths of a simulcast transmission system, said system including a control center and a plurality of transmitter sites for simultaneously transmitting the same information, said distribution paths each including adjustable modulation signal amplitude equalization means and adjustable modulation signal time delay means for initially obtaining substantially identical amplitude and time of arrival of the transmitted information in signal overlap areas between two or more simulcast transmitter sites, said automatic alignment circuit comprising:

control means for sequentially transmitting a test signal from said control center to each transmitter site for sequential retransmission of the test signals to said control center;

means responsive to each retransmission for comparing each of the retransmitted test signals with reference data to produce sequential correction signals;

means responsive to said sequential correction signals for aligning each said distribution path so that substantially identical amplitude and time of arrival of the transmitted modulations in said signal overlap areas are maintained.

20. An automatic alignment circuit as in claim 19 wherein said adjustable amplitude equalization means and adjustable time delay means are manually adjustable.

21. An automatic alignment circuit as in claim 19 wherein said means for aligning further includes:

memory means for storing amplitude and time delay alignment data; and means responsive to said alignment data for modifying the amplitude and time delay of each said distribution path so as to maintain said substantially identical modulations in signal overlap areas.

22. An automatic alignment circuit as in claim 21 wherein said memory means comprise non-volatile RAM storage.

23. An automatic alignment circuit as in claim 21 wherein said means for modifying further includes:

a controllable voltage variable attenuator responsive to said memory means for modifying the amplitude of modulations signal of a said distribution path; and a controllable delay line responsive to said memory means for modifying the time delay of a said distribution path.

24. An automatic alignment circuit as in claim 21 further including:

converter means connected between said memory means and said means for modifying.

25. An automatic alignment circuit as in claim 23 wherein said distribution paths comprise multichannel microwave-multiplex links and said links each include means for generating subaudible tones on one of said channels for providing control signals for transmission of said transmitter sites.

26. An automatic alignment circuit as in claim 25 wherein said means for modifying includes a further controllable delay line responsive to said memory means for modifying the time delay of said control signals of a said link.

* * * * *